(12) United States Patent
Manu et al.

(10) Patent No.: US 11,425,885 B2
(45) Date of Patent: Aug. 30, 2022

(54) CAT LITTER HOLDING AND CLEANING ASSEMBLY

(71) Applicants: Mihai Manu, Bartlett, IL (US); Magdalena Sawicka, Bartlett, IL (US)

(72) Inventors: Mihai Manu, Bartlett, IL (US); Magdalena Sawicka, Bartlett, IL (US)

( * ) Notice: Subject to any disclaimer, the term of this patent is extended or adjusted under 35 U.S.C. 154(b) by 162 days.

(21) Appl. No.: 16/885,907

(22) Filed: May 28, 2020

(65) Prior Publication Data

US 2021/0368730 A1 Dec. 2, 2021

(51) Int. Cl.
  *A01K 1/01* (2006.01)
(52) U.S. Cl.
  CPC .......... *A01K 1/0114* (2013.01); *A01K 1/0125* (2013.01)
(58) Field of Classification Search
  CPC ........ A01K 1/0114; A01K 1/011; B07B 1/02; B07B 1/00
  USPC .................. 119/161, 165, 166, 168; 209/260
  See application file for complete search history.

(56) References Cited

U.S. PATENT DOCUMENTS

| | | | |
|---|---|---|---|
| 4,096,827 A | 6/1978 | Cotter | |
| 4,325,822 A * | 4/1982 | Miller | A01K 1/0114 119/166 |
| 5,012,765 A * | 5/1991 | Naso | A01K 1/0114 119/166 |
| 5,402,751 A | 4/1995 | De La Chevrotiere | |
| 5,577,462 A * | 11/1996 | Korth | A01K 1/0114 119/166 |
| 5,598,810 A * | 2/1997 | Lawton, III | A01K 1/0114 119/166 |
| 5,727,691 A * | 3/1998 | Vittrup | A01K 1/0114 119/166 |
| 6,095,088 A | 8/2000 | Savicki | |
| 6,269,772 B1 * | 8/2001 | Mickey | A01K 1/0114 119/166 |
| D502,576 S | 3/2005 | Miller | |
| 9,185,879 B2 | 11/2015 | Bellini | |
| 10,182,551 B2 | 1/2019 | Sage, Jr. | |
| 2002/0185390 A1 * | 12/2002 | Giguere | B65D 85/62 206/223 |
| 2005/0028745 A1 * | 2/2005 | Baillie | A01K 1/0107 119/165 |
| 2011/0088630 A1 | 4/2011 | Krotts | |

FOREIGN PATENT DOCUMENTS

WO   WO2011037637   3/2011

\* cited by examiner

*Primary Examiner* — Yvonne R Abbott-Lewis

(57) ABSTRACT

A cat litter holding and cleaning assembly includes a housing having a top wall, a bottom wall and a perimeter wall extending between the top and bottom walls. The perimeter wall includes a front side, back side, first lateral side and second lateral side. The front side has an opening extending therethrough for a cat to access an interior of the housing. A filter member is removably mounted in the housing. The filter member includes a perimeter frame bounding an interior area. A filter grid is mounted to the perimeter frame and traverses the interior area. The perimeter frame is extendable across the interior of the housing from the first lateral side to the second side. Litter positioned in the housing flows through the filter grid such that waste material in the litter remains on the filter grid when the housing is inverted.

6 Claims, 5 Drawing Sheets

CAT LITTER HOLDING AND CLEANING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to litter box device and more particularly pertains to a new litter box device for facilitating the removal of waste from the litter.

(2) Description of Related Art Including Information Disclosed Under 37 CFR 1.97 and 1.98

The prior art relates to litter box devices that assist a person in removing clumped litter and solid wastes from the litter.

BRIEF SUMMARY OF THE INVENTION

An embodiment of the disclosure meets the needs presented above by generally comprising a housing having a top wall, a bottom wall and a perimeter wall extending between the top and bottom walls. The perimeter wall includes a front side, back side, first lateral side and second lateral side. The front side has an opening extending therethrough for a cat to access an interior of the housing. A filter member is removably mounted in the housing. The filter member includes a perimeter frame bounding an interior area. A filter grid is mounted to the perimeter frame and traverses the interior area. The perimeter frame is extendable across the interior of the housing from the first lateral side to the second side. Litter positioned in the housing flows through the filter grid such that waste material in the litter remains on the filter grid when the housing is inverted.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
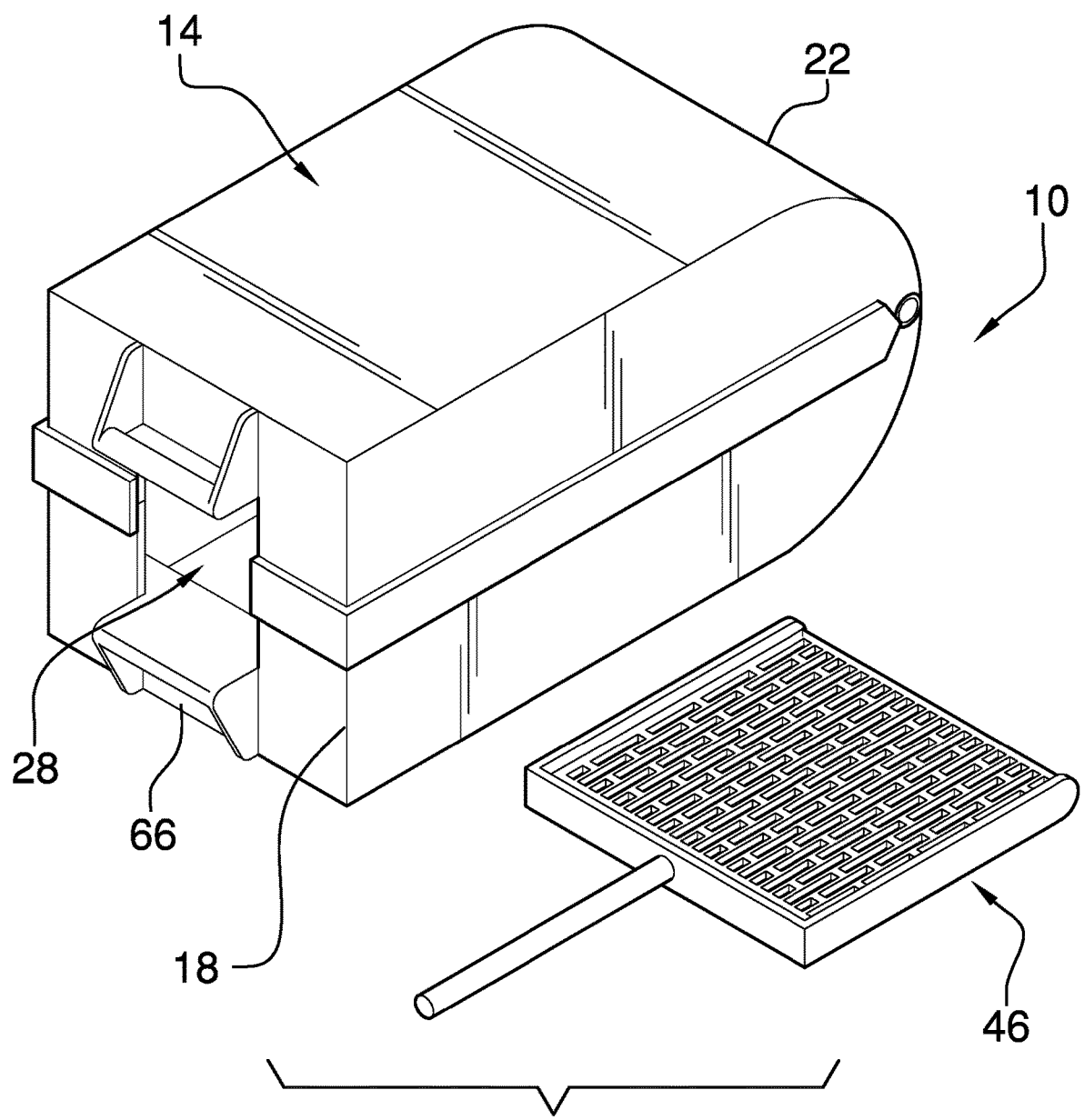
FIG. 1 is a front isometric view of a cat litter holding and cleaning assembly according to an embodiment of the disclosure.
Figure 2:
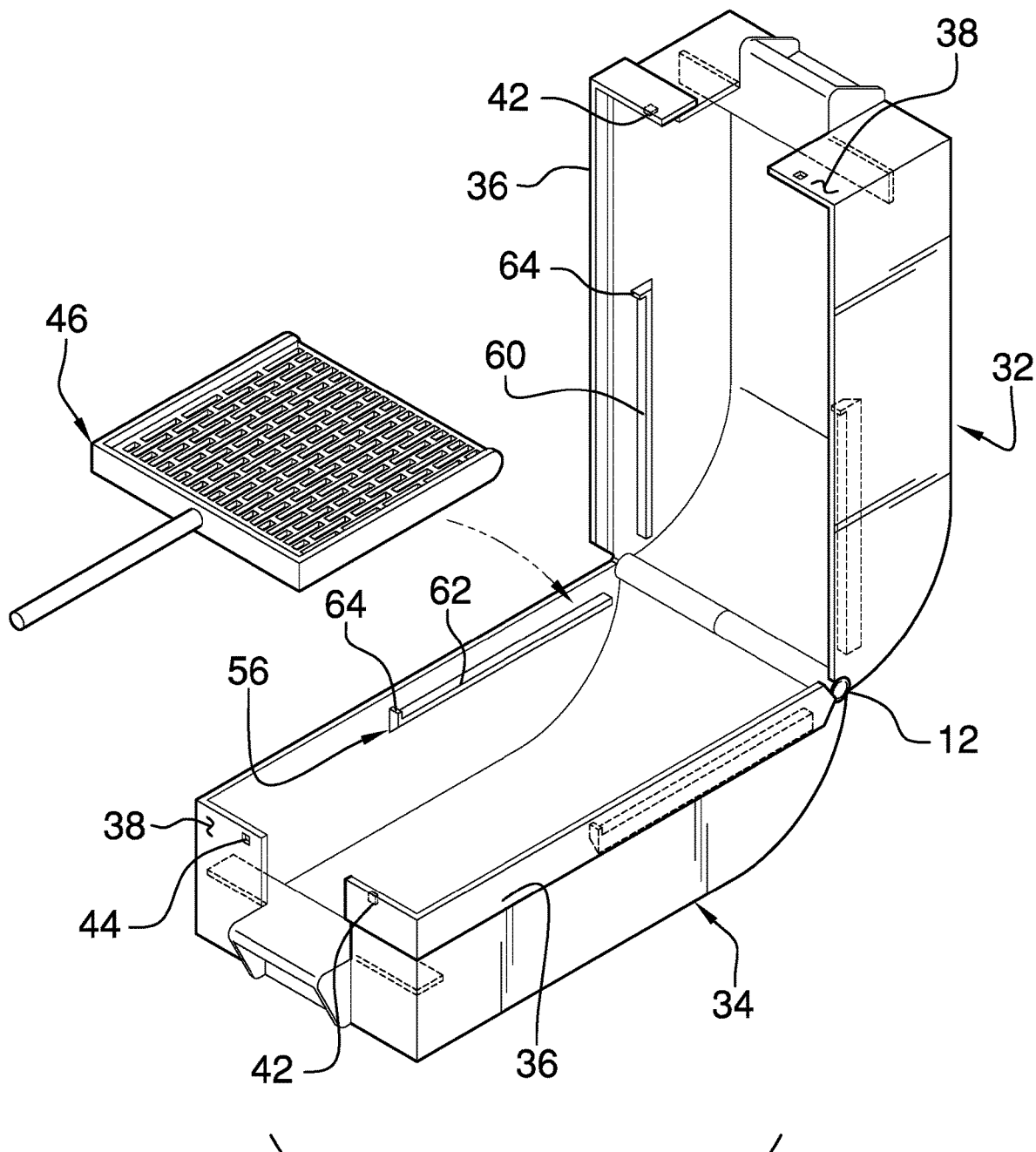
FIG. 2 is a front isometric view of an embodiment of the disclosure.
Figure 3:
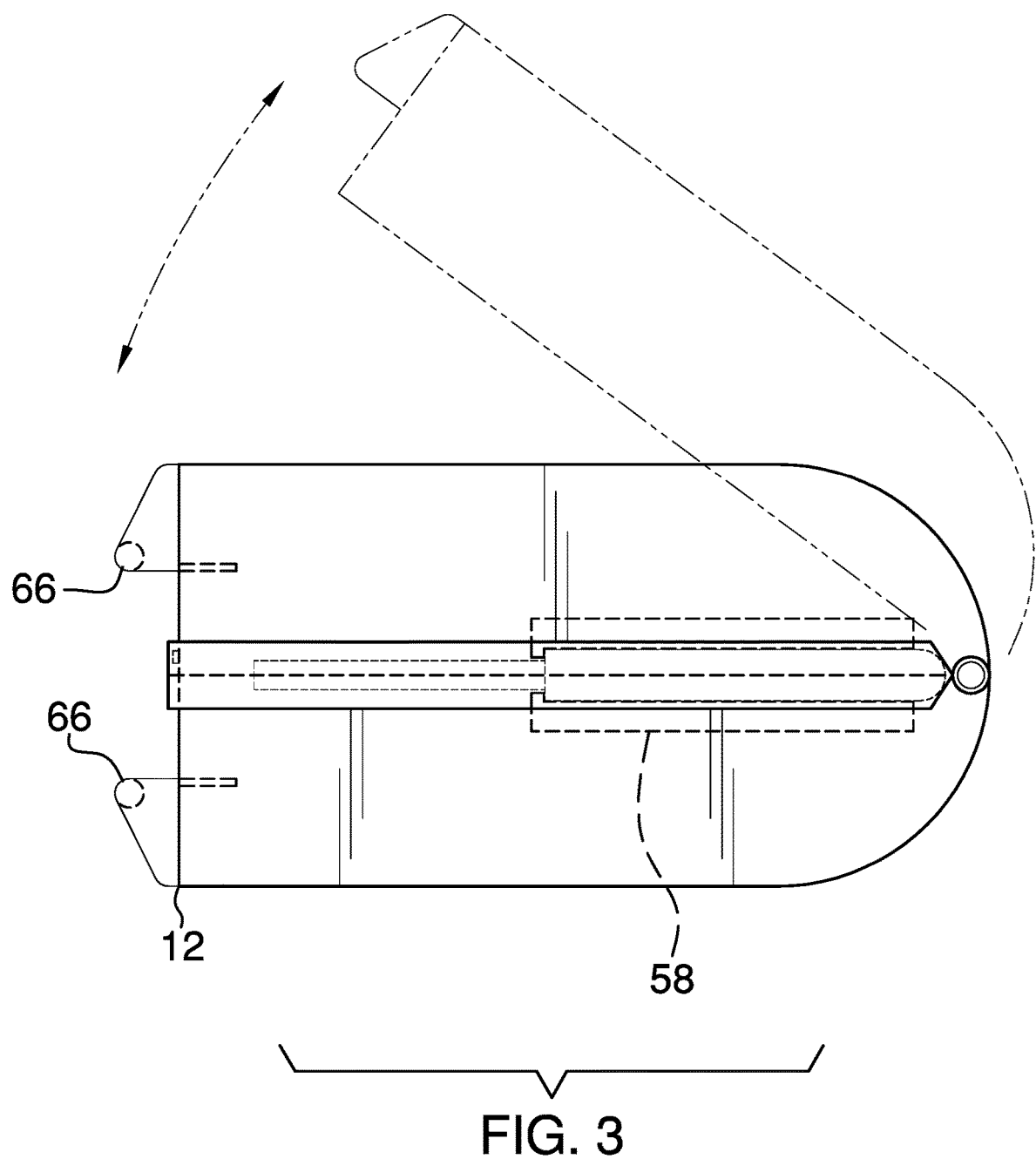
FIG. 3 is a side view of an embodiment of the disclosure.
Figure 4:
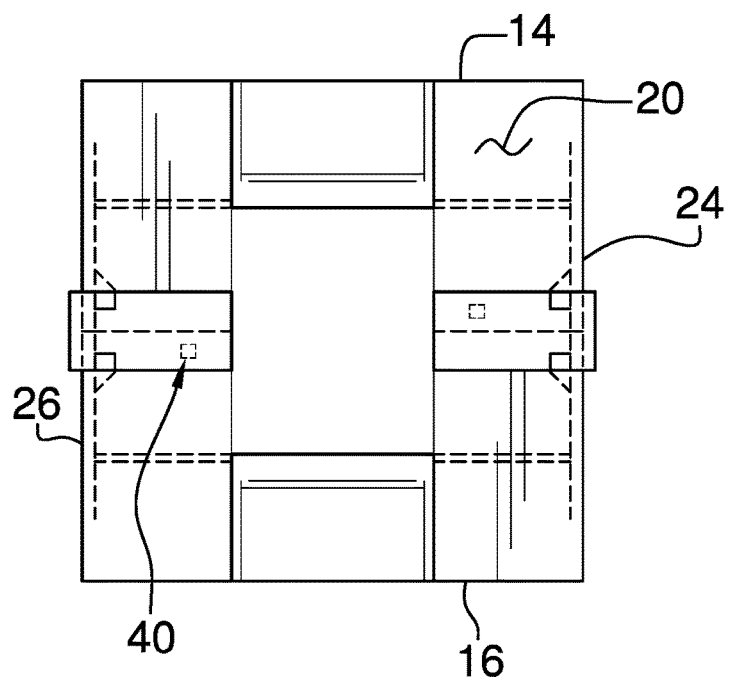
FIG. 4 is a front view of an embodiment of the disclosure.
Figure 5:
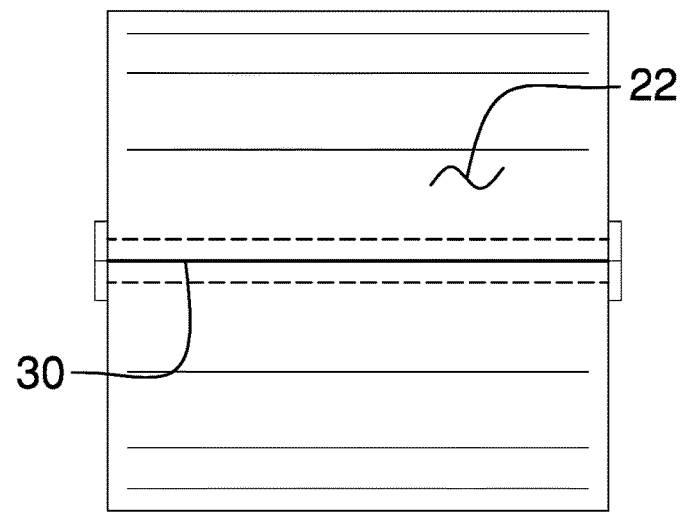
FIG. 5 is a rear view of an embodiment of the disclosure.
Figure 6:
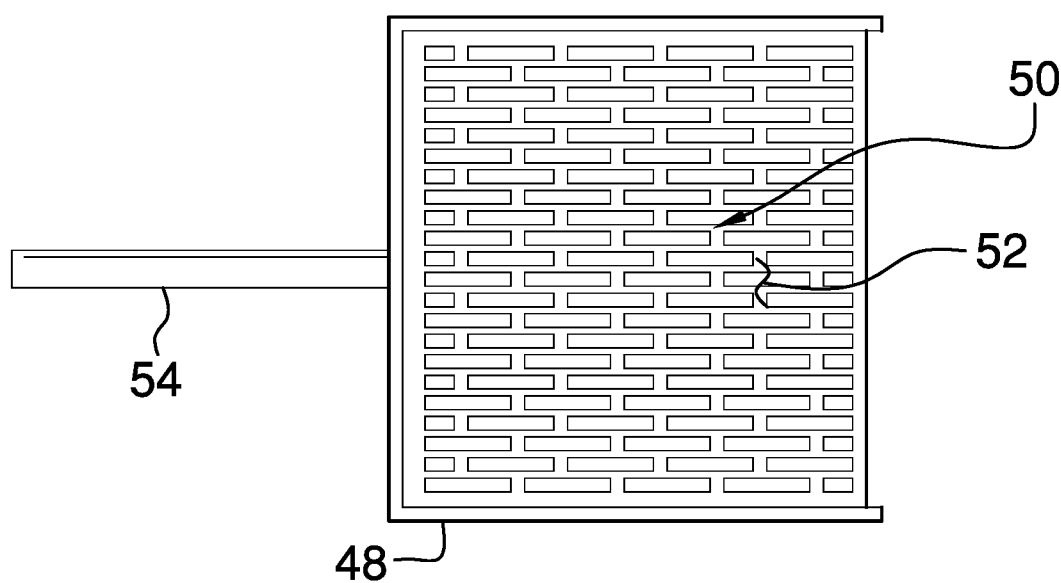
FIG. 6 is a top view of a filter member of an embodiment of the disclosure.

With reference now to the drawings, and in particular to FIGS. 1 through 6 thereof, a new litter box device embodying the principles and concepts of an embodiment of the disclosure and generally designated by the reference numeral 10 will be described.

As best illustrated in FIGS. 1 through 6, the cat litter holding and cleaning assembly 10 generally comprises a housing 12 that has a top wall 14, a bottom wall 16 and a perimeter wall 18 extending between the top 14 and bottom 16 walls. The perimeter wall 18 includes a front side 20, back side 22, first lateral side 24 and a second lateral side 26. The front side 20 has an opening 28 extending therethrough for a cat to access an interior of the housing 12. The back side 22 may have an inner surface being concavely arcuate from the bottom wall 16 to the top wall 14.

The housing 12 has a break 30 therein such that a top portion 32 and a bottom portion 34 of the housing 12 is defined. The top 32 and bottom 34 portions are pivotally coupled together and the opening 28 extends through the break 30. As can be seen in FIG. 1, flanges 36 may be attached to the top 32 and bottom 34 portions such that the flanges 36 extend over mating surfaces 38 opposed to the flanges 36 when the housing 12 is in a closed position to prevent material from flowing between the top 32 and bottom 34 portions.

A locking member 40 may be provided to releasably lock the top 32 and bottom 34 portions in a closed configuration. As can be seen in the Figures, one type of locking member may include one or more detents 42 mounted on the flanges 36 which releasably frictionally engage notches 44 in the mating surfaces 38.

A filter member 46 is removably mounted in the housing 12. The filter member 46 includes a perimeter frame 48 bounding an interior area 50. A filter grid 52 is mounted to the perimeter frame 48 and traverses the interior area 50. A handle 54 is attached to and extends away from the perimeter frame 48. The perimeter frame 48 is extendable across the interior of the housing 12 from the first lateral side 24 to the second side 26.

The housing 12 may include a receiver 56 that is mounted in the housing 12. The receiver 56 releasably receives the perimeter frame 48 to retain the perimeter frame 48 in a horizontal orientation. The receiver 56 may include a pair of guides 58 wherein one of the guides 58 is on the first side 24 and one of the guides 58 is positioned on the second side 26. Each of the guides 58 include an upper section 60 and a lower section 62 wherein the upper section 60 is attached to the top portion 32 and the lower section 62 is attached to the bottom portion 34. The guides 58 may include stops 64 positioned proximal to the opening 28 on the top 32 and bottom 34 sections to prevent the filter member 46 from moving toward the opening 28 and away from the rear side 22.

In use, cat litter is placed in the housing 12 such that the litter is in the bottom portion 34 and is accessible to a cat through the opening 28. When the cat litter has been soiled, the user opens the top portion 32 to place the filter member 46 on the receiver 56 and the top 32 and bottom 34 portions closed. The litter flows through the filter grid 52 such that waste material in the litter remains on the filter grid 52 when the housing 12 is inverted such that the top portion 32 is positioned below the bottom portion 34. Handles 66 are attached to the housing 12, and may be located above and below the opening 28, to assist a user in turning the housing 12 over. The filter member 46 is then removed and the waste discarded of.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A cat litter holding assembly configured to hold a quantity of cat litter and to facilitate sifting of the cat litter, the assembly comprising:

a housing having a top wall, a bottom wall and a perimeter wall extending between the top and bottom walls, the perimeter wall including a front side, back side, first lateral side and a second lateral side, the front side having an opening extending therethrough for a cat to access an interior of the housing, the back side having an inner surface being concavely arcuate from the bottom wall to the top wall, the back side having an outer surface being convexly arcuate from the bottom wall to the top wall;

wherein the housing has a break therein such that a top portion and a bottom portion of the housing is defined, the top and bottom portions being pivotally coupled together, the opening extending through the break;

a filter member being removably mounted in the housing, the filter member including a perimeter frame bounding an interior area, a filter grid being mounted to the perimeter frame and traversing the interior area, the perimeter frame being extendable across the interior of the housing from the first lateral side to the second side, the filter member having a length less than a distance between the front side and the back side;

a receiver being mounted in the housing, the receiver releasably receiving the filter member to retain the filter member within the housing in a horizontal orientation such that the filter grid is positioned coplanar with the break and adjacent to the back side; and wherein litter positioned in the housing flows through the filter grid such that waste material in the litter remains on the fitter grid when the housing is inverted.

2. The cat litter holding assembly according to claim 1, further including a handle being attached to and extending away from the perimeter frame.

3. The cat litter holding assembly according to claim 1, further including a receiver being mounted in the housing; the receiver releasably receiving the perimeter frame to retain the perimeter frame in a horizontal orientation.

4. The cat litter holding assembly according to claim 1, further including a locking member releasably locking the top and bottom portions in a closed configuration.

5. The cat litter holding assembly according to claim 4, further including the receiver releasably receiving the perimeter frame to retain the perimeter frame in a horizontal orientation.

6. A cat litter holding assembly configured to hold a quantity of cat litter and to facilitate sifting of the cat litter, the assembly comprising:

a housing having a top wall, a bottom wall and a perimeter wall extending between the top and bottom walls, the perimeter wall including a front side, back side, first lateral side and a second lateral side, the front side having an opening extending therethrough for a cat to access an interior of the housing, the back side having an inner surface being concavely arcuate from the bottom wall to the top wall, the back side having an outer surface being convexly arcuate from the bottom wall to the top wall;

the housing having a break therein such that a top portion and a bottom portion of the housing is defined, the top and bottom portions being pivotally coupled together, the opening extending through the break;

a filter member being removably mounted in the housing, the filter member including a perimeter frame bounding an interior area, a filter grid being mounted to the perimeter frame and traversing the interior area, a handle being attached to and extending away from the perimeter frame, the perimeter frame being extendable across the interior of the housing from the first lateral side to the second side, the fitter member having a length less than a distance between the front side and the back side;

wherein titter positioned in the housing flows through the filter grid such that waste material in the litter remains on the filter grid when the housing is inverted;

a receiver being mounted in the housing, the receiver releasably receiving the perimeter frame to retain the perimeter frame in a horizontal orientation such that the filter grid is positioned coplanar with the break and adjacent to the back side; and a locking member releasably locking the top and bottom portions in a closed configuration.

* * * * *